United States Patent
Larsson et al.

(10) Patent No.: US 6,704,293 B1
(45) Date of Patent: Mar. 9, 2004

(54) BROADCAST AS A TRIGGERING MECHANISM FOR ROUTE DISCOVERY IN AD-HOC NETWORKS

(75) Inventors: Tony Larsson, Stockholm (SE); Johan Rune, Lidingö (SE); Johan Sörensen, Eslöv (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

(21) Appl. No.: 09/455,460

(22) Filed: Dec. 6, 1999

(51) Int. Cl.$^7$ ............................................. H04L 12/28
(52) U.S. Cl. ........................ 370/255; 370/351; 370/400
(58) Field of Search ................................. 370/351, 400, 370/401, 328, 254, 255

(56) References Cited

U.S. PATENT DOCUMENTS

| | | | |
|---|---|---|---|
| 5,051,984 A | 9/1991 | Mostafa et al. | |
| 5,056,085 A | 10/1991 | Vu | |
| 5,065,399 A | 11/1991 | Hasegawa et al. | |
| 5,173,689 A | 12/1992 | Kusano | |
| 5,235,599 A | 8/1993 | Nishimura et al. | |
| 5,719,861 A | 2/1998 | Okanoue | |
| 5,740,366 A | 4/1998 | Mahany et al. | |
| 5,748,611 A | 5/1998 | Allen et al. | |
| 5,987,011 A | * 11/1999 | Toh ............................ | 370/331 |
| 6,304,556 B1 | * 10/2001 | Haas .......................... | 370/254 |

FOREIGN PATENT DOCUMENTS

| | | |
|---|---|---|
| EP | 0599764 | 6/1994 |
| EP | 0883265 | 12/1998 |
| EP | 0913965 | 5/1999 |
| WO | 9911025 | 3/1999 |
| WO | 9923799 | 5/1999 |

OTHER PUBLICATIONS

W. Richard Stevens, "TCP/IP Illustrated, vol. 1, The Protocols," 1994, Addison–Wesley, pp. 53–64.*

Pravin Bhagwat and Adrian Segall, "A Routing Vector Method (RVM) for Routing in Bluetooth Scatternets," IEEE 1999, pp. 375–379.*

Albrecht, M.,et al., "IP Services over Bluetooth: Leading the Way to a New Mobility", Proceedings of the Conference on Local Computer Networks, Oct. 1999.

Tode, H., et al., "A Routing Method Using a Tunable Cost Function to Obtain Required Communication Quality and Performance", Electronics and Communications in Japan, Part 1. Vol, 81, No. 5, 1998.

Haartsen, J., "Bluetooth—The Universal Radio Interface for Ad Hoc, Wireless Connectivity", Ericsson Review No. 3 (1998), pp. 110–117.

Takagi, Hideaki, "Queuing Analysis of Polling Models", ACM Computing Surveys, vol. 20, No. 1, Mar. 1988.

Johansson, Per, et al., "Short Range Radio Based Ad–hoc Networking: Performance and Properties", Proceedings of International Conference on Communications (ICC '99), Jun. 6–10, 1999.

"Specification of the Bluetooth System", Bluetooth SIG, vol. 10, pp. 35–40 and 121–122; Jul. 24, 1999.

European Search Report Issued Jul. 28, 2000.

* cited by examiner

Primary Examiner—Chau Nguyen
Assistant Examiner—Keith M. George
(74) Attorney, Agent, or Firm—Burns, Doane, Swecker & Mathis, LLP

(57) ABSTRACT

A method and/or an apparatus which places a broadcast message which the source expects a reply message in a broadcast message for route discovery. The combined message is broadcast throughout the ad-hoc network. When the combined broadcast message is received at the destination node, the destination node generates a response message including a reply message to the broadcast message that the source node expects a reply. The response message is sent back to the source node over the route which the combined broadcast message traveled to the destination node.

36 Claims, 11 Drawing Sheets

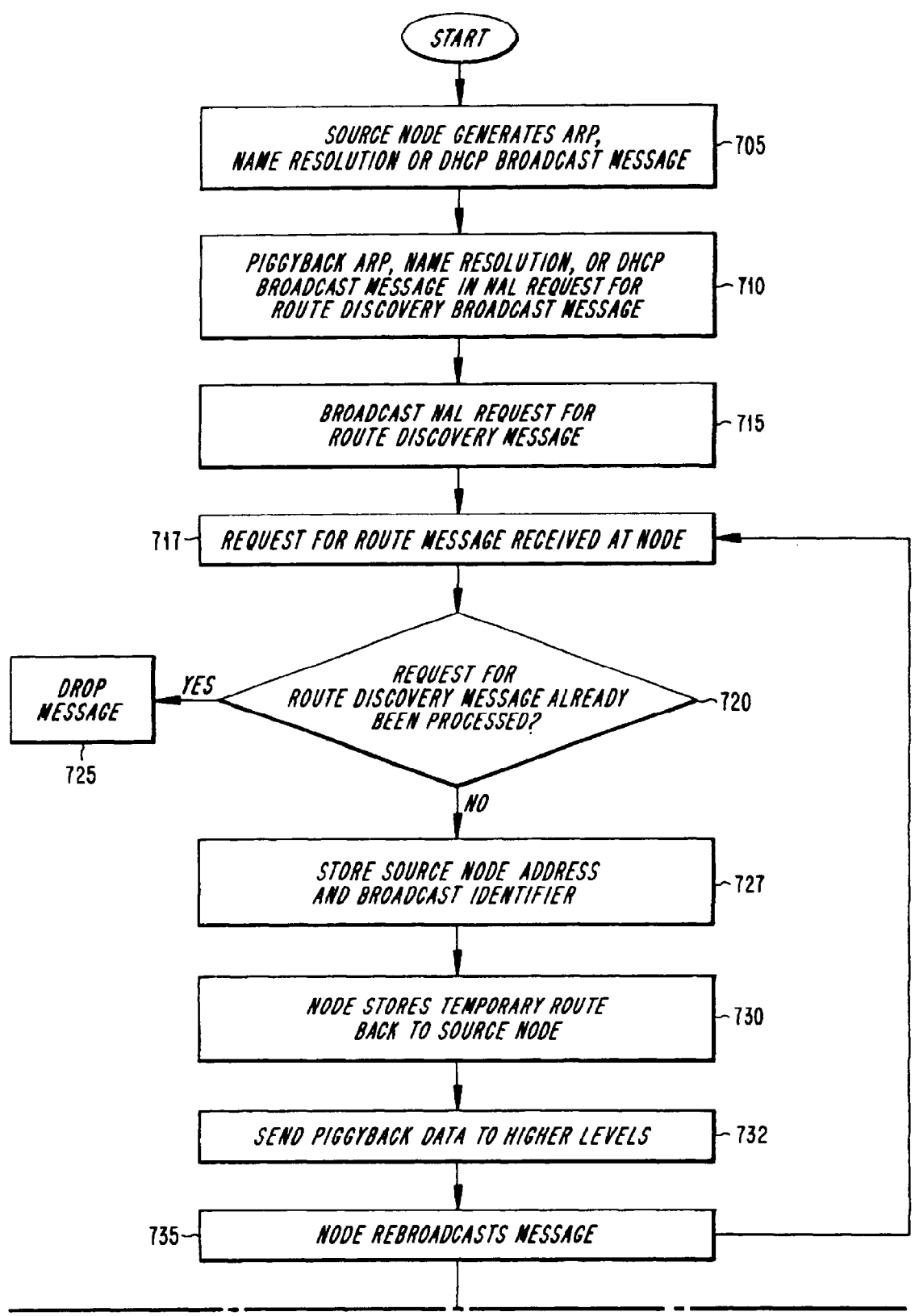

BROADCAST AS A TRIGGERING MECHANISM FOR ROUTE DISCOVERY IN AD-HOC NETWORKS

This application is related to: U.S. Pat. No. 6,535,498 "Route Updating In Ad-Hoc Networks"; U.S. Provisional Application No. 60/168,742 "Route Discovery Based Piconet Forming"; U.S. patent application Ser. No. 09/454,758 "Inter Piconet Scheduling"; and U.S. Pat. No. 6,480,505 "Batched Fair Exhaustive Polling Scheduler", all of which are herein expressly incorporated by reference.

BACKGROUND

The present invention relates to ad-hoc networks. More particularly, the present invention relates to routing in ad-hoc networks.

Conventional networking protocols are based on the characteristics and/or features of fixed networks. In fixed networks, the network configuration typically does not change. Although nodes can be added and removed in fixed networks, the route traveled by data packets between two nodes typically does not change. The disadvantage is that fixed networks cannot be easily reconfigured to account for increases in data traffic, also called system loading. Accordingly, when system loading increases for one node, the surrounding nodes are likely to experience increased delays in the transmission and reception of data.

In contrast to fixed networks, ad-hoc networks are dynamic. An ad-hoc network is formed when a number of nodes decide to join together to form a network. Since nodes in ad-hoc networks operate as both hosts and routers, ad-hoc networks do not require the infrastructure required by fixed networks. Accordingly, ad-hoc networking protocols are based upon the assumption that nodes may not always be located at the same physical location.

Bluetooth is an exemplary ad-hoc networking technology. Bluetooth is an open specification for wireless communication of both voice and data. It is based on a short-range, universal radio link, and it provides a mechanism to form small ad-hoc groupings of connected devices, without a fixed network infrastructure, including such devices as printers, PDAs, desktop computers, FAX machines, keyboards, joysticks, telephones or virtually any digital device. Bluetooth operates in the unlicenced 2.4 GHz Industrial-Scientific-Medical (ISM) band.

FIG. 1 illustrates a Bluetooth piconet. A piconet is a collection of digital devices, such as any of those mentioned above, connected using Bluetooth technology in an ad-hoc fashion. A piconet is initially formed with two connected devices, herein referred to as Bluetooth devices. A piconet can include up to eight Bluetooth devices. In each piconet, for example piconet 100, there exists one master Bluetooth unit and one or more slave Bluetooth units. In FIG. 1 Bluetooth unit 101 is a master unit and unit 102 is a Bluetooth slave unit.

According to Bluetooth technology a slave unit can only communicate directly with a master unit. FIG. 2 illustrates a piconet with a master unit 201 and a plurality of slave units 202–208 arranged in a star network topology. If slave unit 202 wishes to communicate with slave unit 206, slave unit 202 would have to transmit the information it wished to communicate to master unit 201. Master unit 201 would then transmits the information to slave unit 206.

A scatternet is formed by multiple independent and unsynchronized piconets. FIG. 3 illustrates an exemplary scatternet 300. In FIG. 3, piconet 1 includes a master node 303 and the slave nodes 301, 302 and 304; piconet 2 includes the master node 305 and the slave nodes 304, 306, 307 and 308; and piconet 3 includes the master node 309 and the slave nodes 308, 310 and 311. To implement a scatternet it is necessary to use nodes which are members of more than one piconet. Such nodes are herein referred to as forwarding nodes. If, for example, node 301 wishes to communicate with node 310, then nodes 304 and 308 might act as forwarding nodes by forwarding the connection between the two piconets and in particular between nodes 301 and 310. For example, node 301 transfers the information to the master node of piconet 1 node 303. Master node 303 transmits the information to forwarding node 304. Forwarding node 304 then forwards the information to master node 305, which in turn, transmits the information to forwarding node 308. Forwarding node 308 forwards the information to master node 309 which transmits the information to the destination node 310.

FIG. 4a illustrates the protocol layers of two conventional Bluetooth units. As indicated, both units 401 and 402 includes a high level protocol or application 411. They also include a network layer 421, a data link layer including a logical link control and adaptation protocol (L2CAP) 441 and link manager protocol (LMP), and the physical layer including a baseband component.

In general, the protocols which govern the formation and/or updating of routes in an ad-hoc network may be classified as either proactive or reactive. Proactive routing protocols attempt to update and maintain routes between nodes, including routes which are not currently in use. Typically, proactive routing protocols react to network topology changes, even if there is no current traffic which is affected by the topology change. To update and maintain the routes between nodes in an ad-hoc network employing proactive routing, each node periodically transmits control information to other nodes in the network. However, this requires a large amount of signaling, which consumes precious bandwidth and leads to network congestion. The network congestion, in turn, results in greater transmission delays for packets traveling through the network.

In contrast to proactive routing protocols, reactive routing protocols establish routes only when there is an immediate need to transmit packets. Moreover, reactive routing protocols only maintain information about routes which are currently being used for transmitting data packets. Accordingly, reactive protocols result in less network signaling, and hence, less network congestion and less delay due to the congestion as compared to proactive routing protocols.

FIG. 5 illustrates conventional routing techniques. In step 505 the source node generates a message. In step 510 the node determines whether the message is a broadcast message or a unicast message. If the message is a broadcast message, in accordance with the "Broadcast" path out of decision step 510, then the source node broadcasts the packets to its neighbor nodes.

If the message is a unicast message, in accordance with the "Unicast" path out of decision step 510, then it is determined whether the source node knows a route to the destination node in accordance with step 520. If a route to the destination node is known, in accordance with the "Yes" path out of decision step 520, the source node will send the unicast message to the node specified in the source node's routing table in accordance with step 525.

If a route to the destination node is not known, in accordance with the "No" path out of decision step 520, then the source node broadcasts a request for route message in accordance with step 530. In step 535 a neighbor node receives the request for route message. In step 540 the neighbor node determines whether it has already processed the request for route message. The neighbor node makes this determination based upon a source node address and broadcast identifier in the request for route message. If the neighbor node has already processed the request for route message, in accordance with the "Yes" path out of decision step 540, the node will drop the message in accordance with step 545.

If the node has not already processed the message, in accordance with the "No" path out of decision step 540, then the node stores the source node address and broadcast identifier. In step 555 the node rebroadcasts the request for route message to its neighbor nodes. In step 560 the node determines whether it is the destination node. If the node determines that it is not the destination node, in accordance with the "No" path out of decision step 560, then the node is done with its processing for this message. However, if the node is the destination node, in accordance with the "Yes" path out of decision step 560, the node will send a response back to the source node in accordance with step 565. In step 570 the source node sends the unicast message to the destination node over the newly established route. In accordance with reactive routing, the source node will only request a new route when the actual route being used is broken.

In conventional networks there are typically two types of broadcast messages. The first type of broadcast message are messages which the source node sends to spread information to other nodes in the network. When this type of broadcast message is sent the source does not expect to receive a reply message. The second type of broadcast message are messages which the source node expects to receive a reply message from one or more network nodes.

Since ad-hoc networks are dynamic, nodes may change their location in the network. When the node changes its location, the node may not have the same address as the node had at its prior location. In order to transmit data from a source node to a destination node the source node may first obtain its own network address, resolve the name of the destination, obtain the hardware address of the destination node and determine a route to the destination node. However, since conventional ad-hoc routing protocols are based on the characteristics and/or features associated with fixed networks, the conventional ad-hoc routing protocols assume that the source node and destination node hardware addresses are known.

One exemplary networking protocol is Internet Protocol (IP). In IP there are several different broadcast messages that a source node generates where the source node expects a reply from one or more node(s) in the network. In IP three exemplary types of broadcast messages where the source expects a reply are dynamic host configuration protocol (DHCP), name resolution and address resolution protocol. DHCP is concerned with dynamic allocation of IP addresses to nodes. Name resolution is used to obtain the IP address when the name of the node. ARP is used when the logical address of the node is known, e.g., the IP address, but the hardware address, e.g., the Ethernet address of the node is not known.

Accordingly, in an ad-hoc network the source node may have to perform a separate broadcast for DHCP, name resolution or ARP, and route discovery before the source node can begin to transmit data to the destination node. These separate broadcasts result in delay in sending the information from the source node to the destination node. Sending these separate broadcasts also adds to the load of the network.

Accordingly, it would be desirable to minimize the number of broadcast messages required for setting up a route from a source node to a destination node when employing reactive protocols in an ad-hoc network.

SUMMARY

These and other problems, drawbacks and limitations of conventional techniques are overcome according to the present invention by placing a broadcast message which the source expects a reply message in a broadcast message for route discovery. The combined message is broadcast throughout the ad-hoc network. When the combined broadcast message is received at the destination node, the destination node generates a response message including a reply message to the broadcast message that the source node expects a reply. The response message is sent back to the source node over the route which the combined broadcast message traveled to the destination node.

Accordingly, it is an objective of the present invention to minimize the amount of broadcasts required for setting up a route in an ad-hoc network.

It is another objective of the present invention to minimize the load on the network when setting up a route in an ad-hoc network by placing a broadcast message which the source node expects a reply message in a broadcast message which determines a route to the node which generates the reply message.

It is also an objective of the present invention to lower the delay at the source node by speeding up the signaling required to set up a route between a source and destination node.

In accordance with one aspect of the present invention, the foregoing and other objects are achieved by a method and/or an apparatus for determining a route from a source node to a destination node, wherein a request for route broadcast message is used to discover and establish routes between the source node and destination node. The source node generates a broadcast message for which the source node expects a reply message. The broadcast message is placed in a request for route broadcast message. The source node then broadcasts the request for route broadcast message to neighboring nodes.

In each of the neighboring nodes it is determined whether the particular neighboring node is the node which generates a reply message. If the particular node is the node which generates a reply message then a response message to the request for route broadcast message is generated. The response message is sent to the source node over the temporary route stored in each neighboring node in a path between the source node and the node which generated the reply message. As the response message is sent from the node which generate the reply message to the source node a route is activated in each of the neighboring nodes in the route between the source node and the destination node.

In accordance with yet another aspect of the present invention, the foregoing and other objects are achieved by a method and/or an apparatus for determining a route from a source node to another node, wherein all nodes in the network include a network adaptation layer and a higher layer. In the higher layer of the source node a broadcast message for which the source node expects a reply message is generated. The message for which the source node expects a reply message is placed in a network adaptation layer request for route broadcast message. The network adaptation layer request for route broadcast message is broadcast from the source node to neighboring nodes.

BRIEF DESCRIPTION OF THE DRAWINGS

The objects and advantages of the invention will be understood by reading the following detailed description in conjunction with the drawings in which.

DETAILED DESCRIPTION

The present invention is directed to minimizing the amount of broadcast messages sent during route discovery. In general, the present invention accomplishes this by combining broadcast messages which the source node expects a reply message with broadcast messages for route discovery. In so doing, the broadcast messages for which a source node expects a reply message can also be used to support route discovery.

In the following, the present invention is described as a route discovery technique for use in a Bluetooth scatternet. However, one skilled in the art will recognize that the present invention is applicable to wireline or wireless networks, fixed networks and other types of ad-hoc networks.

Every broadcast message should contain a broadcast identifier in the network adaptation layer header. In addition, the broadcast messages should contain a source address which uniquely identifies the source. For example, at the time of manufacture each Bluetooth unit is assigned a globally unique 48 bit IEEE 802 address called the Bluetooth Device Address (BD_ADDR) which is never changed. Accordingly, the broadcast identifier together with the source address will uniquely identify the particular broadcast.

Figure 6A:
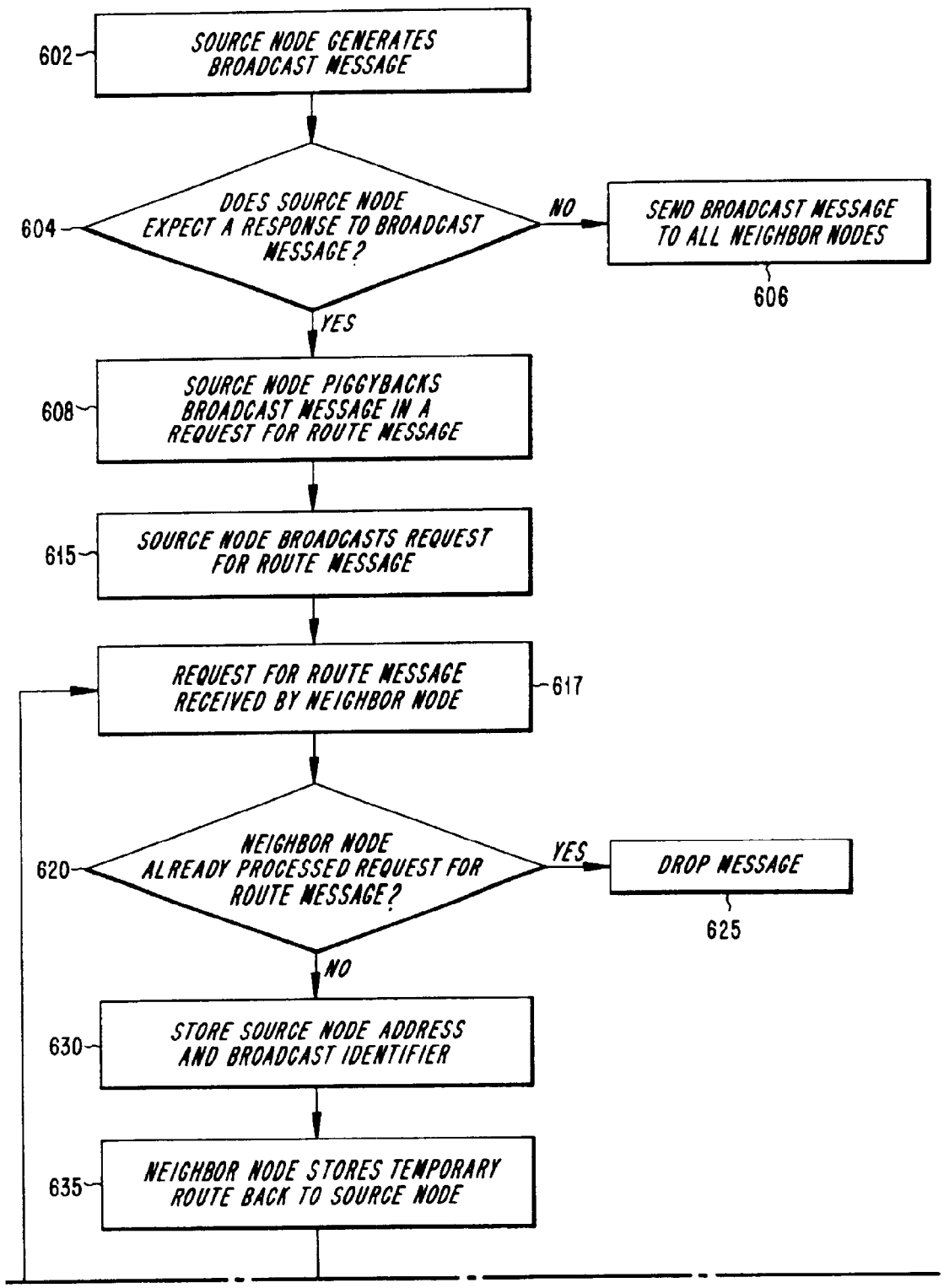
FIG. 6 illustrates an exemplary method for performing route discovery in an ad-hoc network.
Figure 6B:
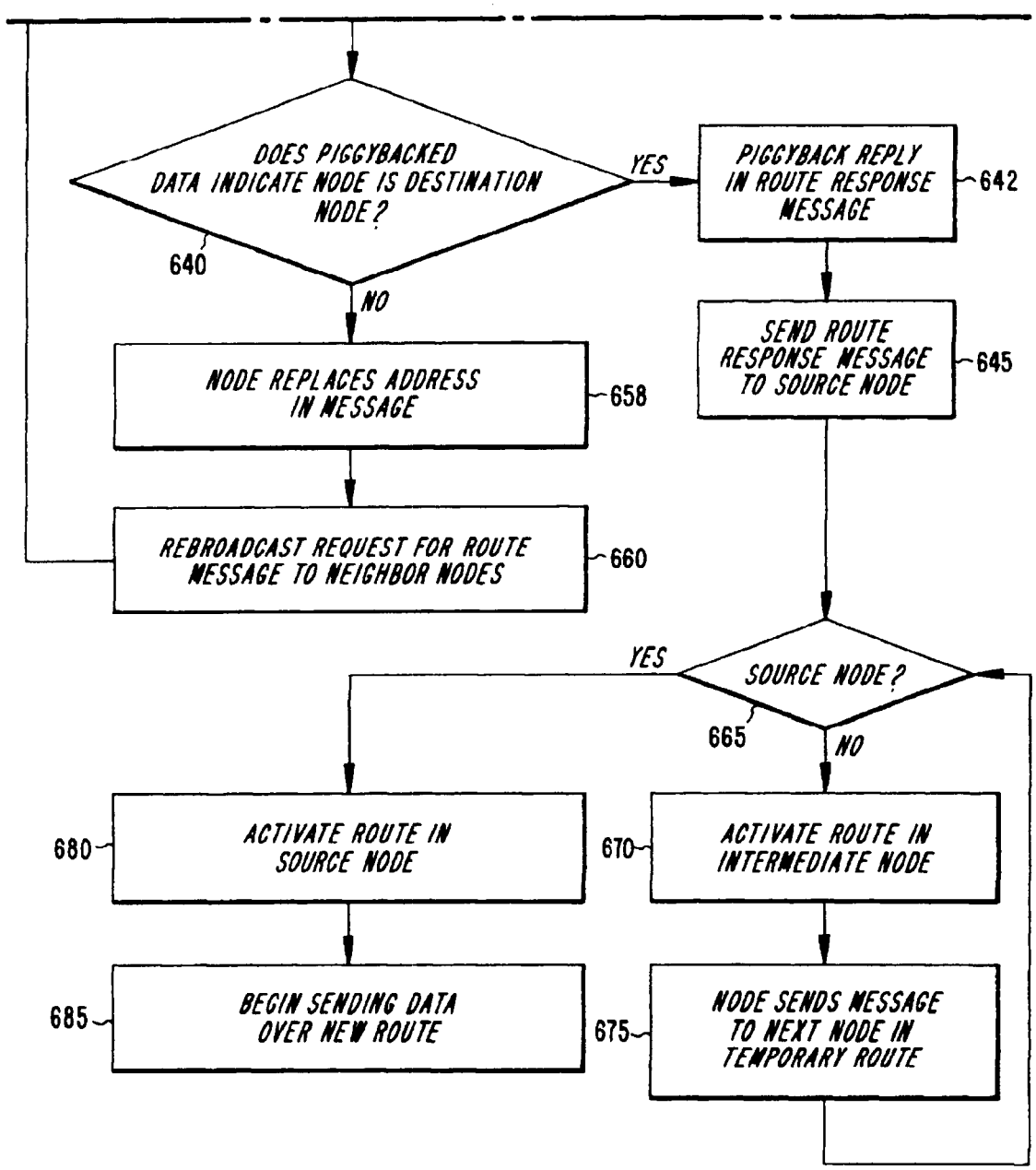

FIG. 6 illustrates an exemplary method for using broadcast messages for route discovery. In step 602 the source node generates a broadcast message. In step 604 the source node determines whether the broadcast message is the type for which the source node expects a reply message. If the source node does not expect a reply message, in accordance with the "No" path out of decision step 604, the source node will broadcast the message to all neighbor nodes in accordance with step 606.

Figure 1:
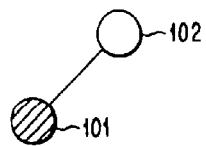
FIG. 1 illustrates an exemplary piconet.
Figure 2:
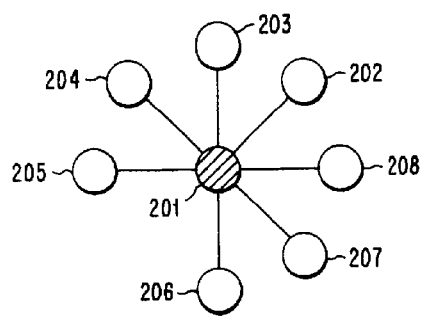
FIG. 2 illustrates an exemplary star-topology network.
Figure 3:
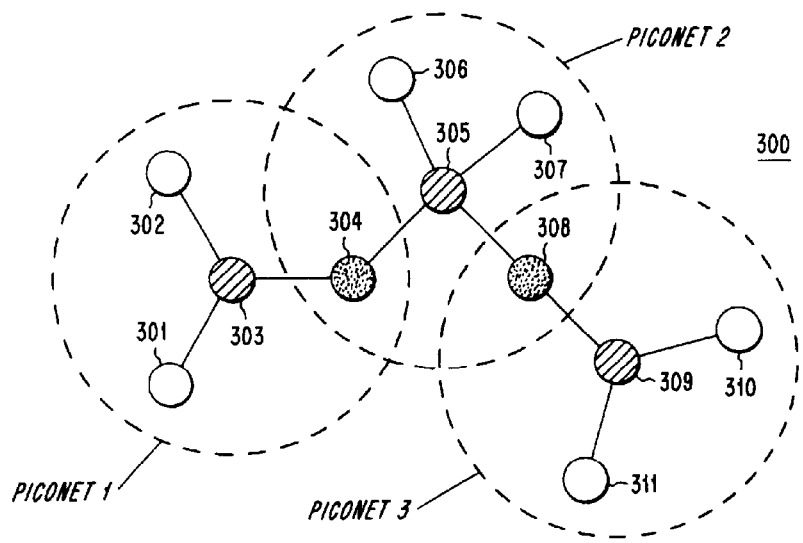
FIG. 3 illustrates an exemplary scatternet formed by a plurality of piconets.

If the source node does expect a reply to the broadcast message, in accordance with the "Yes" path out of decision step 604, the source node piggybacks the broadcast message in a request for route broadcast message in accordance with step 608. In addition, if the source node cannot determine whether it expects a reply message in response to the broadcast message then the source node will piggyback the broadcast message in a request for route message in accordance with the "Yes" path out of decision step 604. In step 615 the source node broadcasts the request for route message to its neighbor nodes. For example, referring now to FIG. 3, if node 303 were the source node then the broadcast message would be sent to nodes 301, 302 and 304. Alternatively, the source node will only broadcast the request for route message to forwarding nodes.

In step 617 the request for route message is received by a neighbor node. In step 620 the neighbor node determines whether the node has already processed the request for route message. Each node has a broadcast buffer which stores the source address and broadcast identifier pair. The broadcast buffer also stores the time which the message has been received to determine if the node has processed the broadcast message within a predetermined period of time. As one skilled in the art will recognize the predetermined time period is set long enough that the node will not rebroadcast a message it has already rebroadcast, but short enough that the buffer does not require an extensive amount of memory. If the node determines that source address and broadcast identifier pair of the received message matches one of the source address and broadcast identifier pairs stored in the broadcast buffer, in accordance with the "Yes" path out of decision step 620, the node will drop the message in accordance with step 625.

If the node determines that the request for route message has not been previously processed, in accordance with the "No" path out of decision step 620, the node will store the source address and broadcast identifier pair in the broadcast buffer along with the time that the request for route message was received by the node in accordance with step 630. In step 635 the node stores a temporary route back to the source.

In step 640 the node determines whether the piggybacked data indicates that the node is the destination node. If the piggybacked data does not indicate that the node is the destination node, in accordance with the "No" path out of decision step 640, the node replaces its address in the request for route message in accordance with step 658. Alternatively, if the protocol used provides a mechanism for retrieving this information from the lower layers, the node will not need to insert its own address. In step 660 the node rebroadcasts the request for route message to its neighbor nodes. This processing occurs in each node which receives the broadcast message as illustrated by the return path from step 660 to step 617.

If the piggybacked data indicates that the node is the destination node, in accordance with the "Yes" path out of decision step 640, the node will piggyback a reply message in the route response message in accordance with step 642. In step 645 the node will send the route response to the next node in the temporary route. In step 665 the next node determines whether it is the source node by examining the address in the message. If the node is not the source node, in accordance with the "No" path out of decision step 665, the node activates the route in accordance with step 670. In step 675 the node sends the route response message to the next node in the temporary route. If the node is the source node, in accordance with the "Yes" path out of decision step 665, the node activates the route in accordance with step 680. In step 685 the source node begins sending data over the new route identified in the route response message. Since a period of time will have passed between the time that the source node requested a route to the destination and the source node has received the route response, the source node can buffer the data packets which it desires to transmit over the route. Alternatively, the source node can simply drop the packets. Since the destination node does not rebroadcast the request to surrounding nodes, the surrounding nodes will not be disturbed by the route request broadcast. This will remove some of the load on the network.

It would be desirable to support IP in a Bluetooth scatternet. However, since Bluetooth requires the slave nodes to communicate through a master node to transmit data to other nodes, Bluetooth does not provide a true shared network. Accordingly, Bluetooth cannot currently support IP.

Figure 4A:
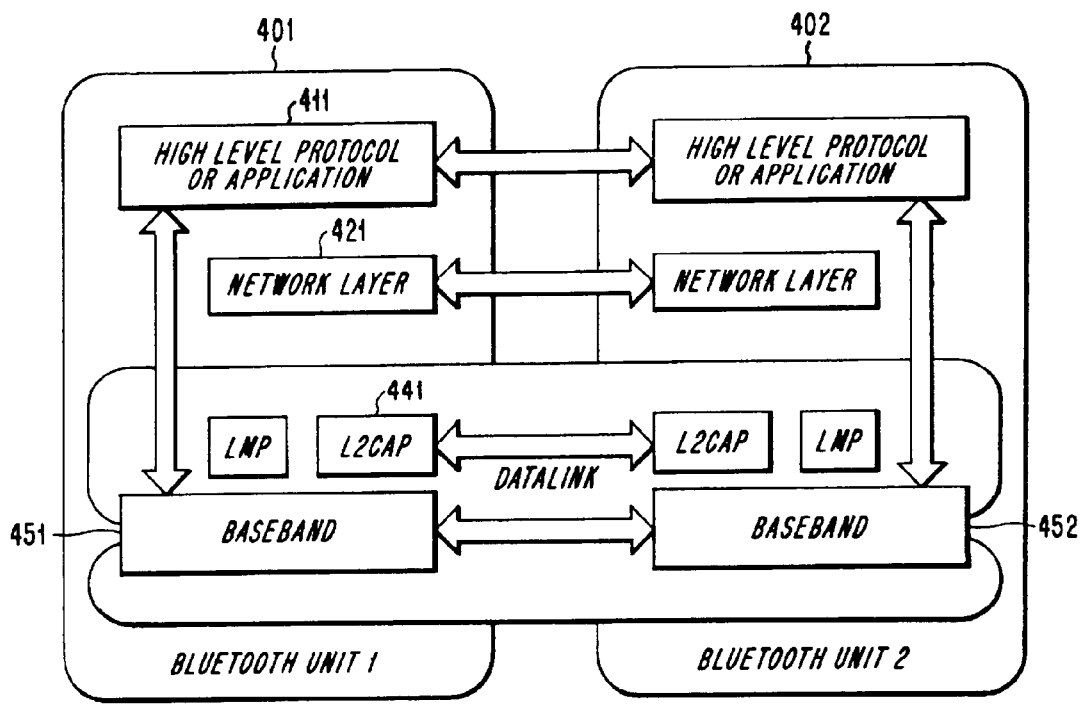
FIG. 4a illustrates the protocol layers of a conventional Bluetooth unit.
Figure 4B:
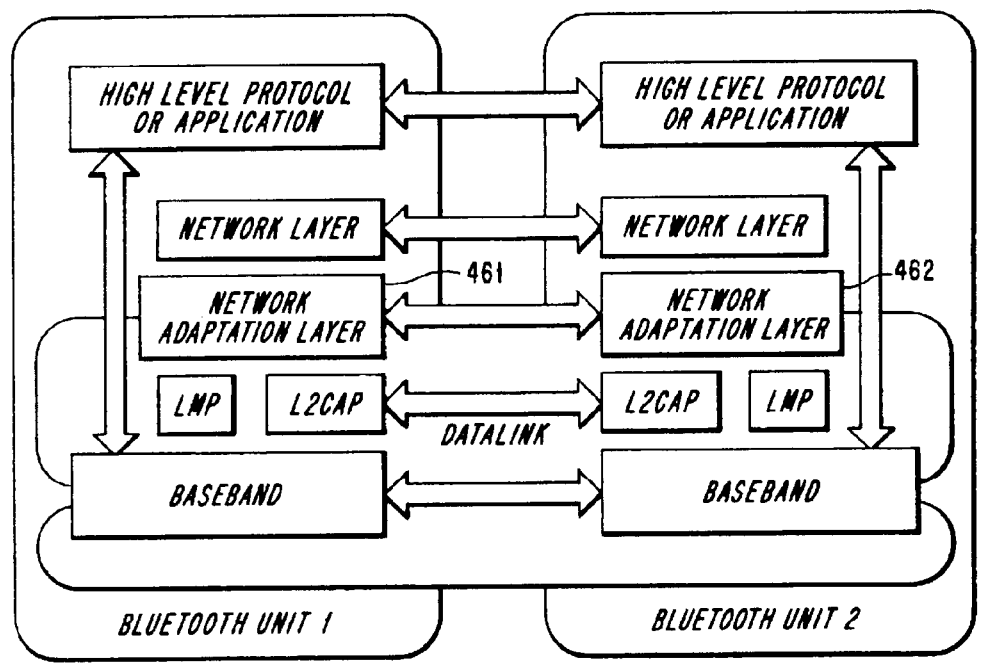
FIG. 4b illustrates the protocol layers of a Bluetooth unit according to an exemplary embodiment of the present invention.
Figure 5:
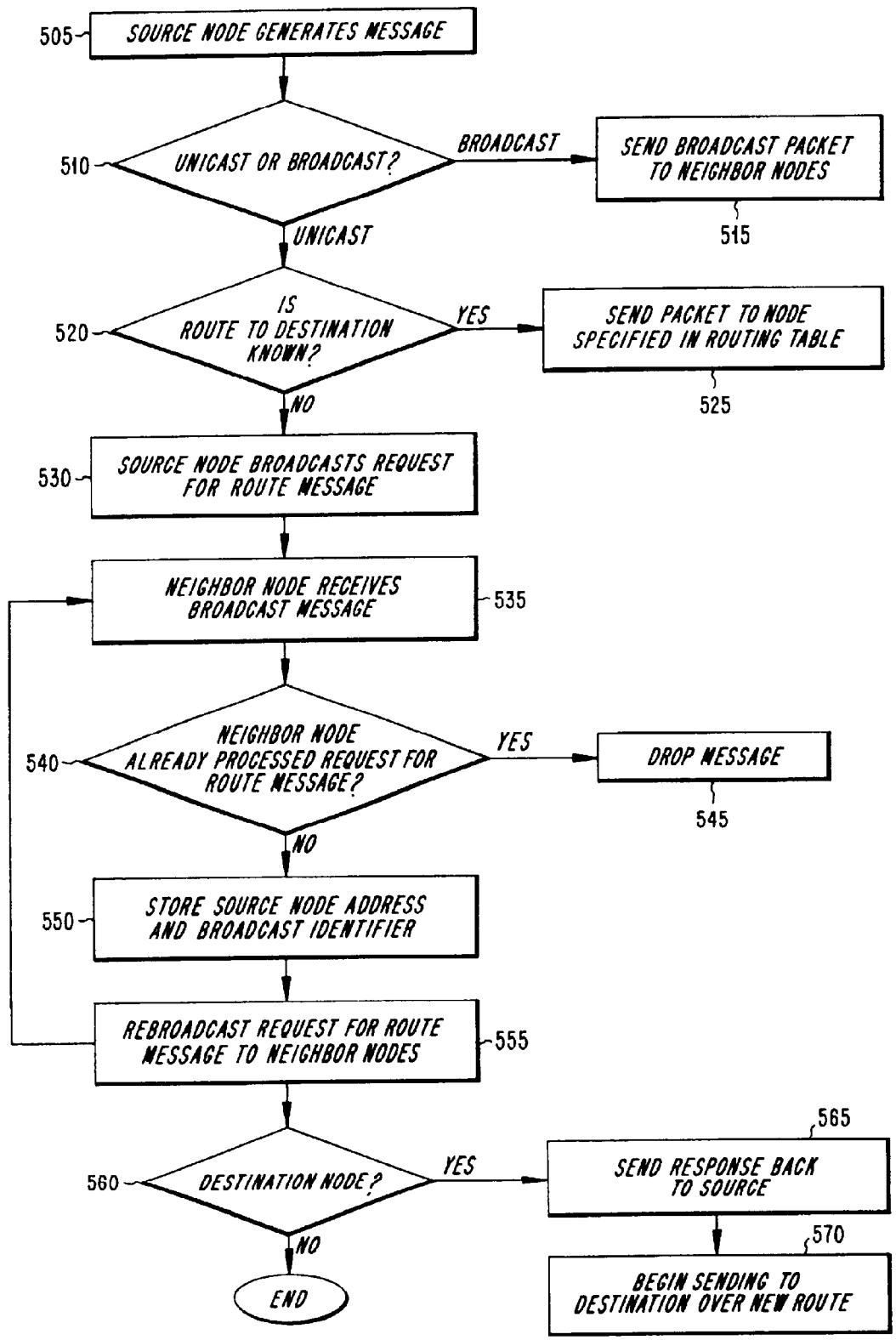
FIG. 5 illustrates conventional route discovery techniques.

FIG. 4b illustrates exemplary Bluetooth units which can implement IP. The Bluetooth units of FIG. 4b are similar to the Bluetooth units of FIG. 4a with the exception that the Bluetooth units of FIG. 6 include a network adaptation layers 461 and 462. Using the network adaptation layer, an entire scatternet can be regarded as an IP subnet. Since the IP protocol layer assumes that there is a shared network, the network adaptation layer emulates a shared network, i.e., a broadcast network. The network adaptation layer provides a routing mechanism to route information within a scatternet while emulating towards the IP layer that the scatternet is actually a single shared network medium. Regardless of the routing mechanism which is implemented, the network adaptation layer uses the above described forwarding nodes to transfer information from one piconet to another piconet.

Figure 7B:
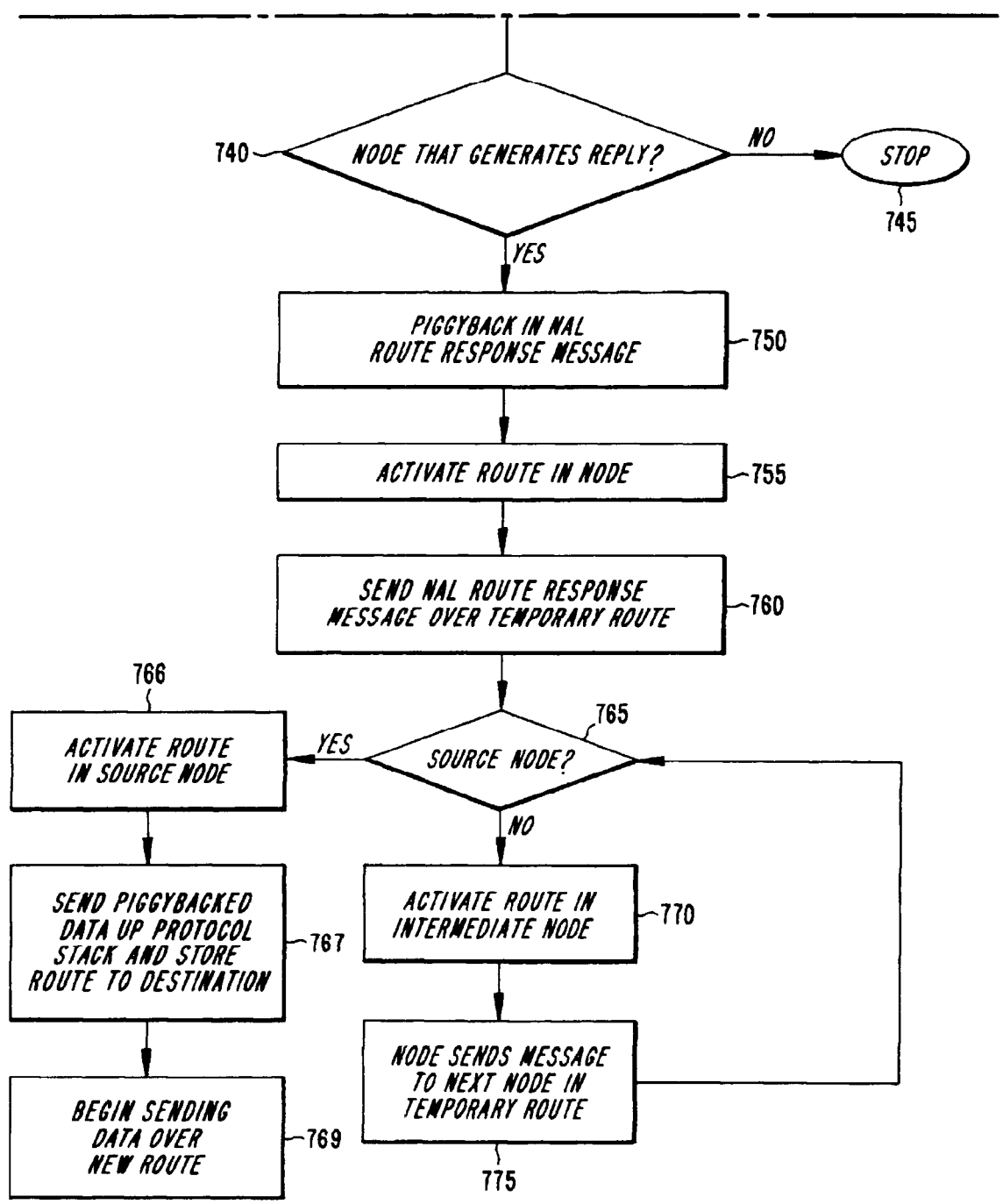
FIG. 7 illustrates an exemplary method for combining a broadcast for which a source node expects a reply message with route discovery in an ad-hoc network.

FIG. 7 illustrates an exemplary method for triggering route discovery in an IP network using DHCP, name resolution or ARP broadcast messages. As described above, when a source node broadcasts messages for DHCP, name resolution or ARP the source node expects a reply message. By combining route discovery with DHCP, name resolution or ARP results in less messages traversing the network. Accordingly, the messages described in FIG. 7 are merely exemplary and the method is equally applicable to other types of broadcast messages which the source node expects a reply message.

In step 705 the source node generates the ARP, name resolution or DHCP broadcast message and delivers the message to the network adaptation layer. In step 710 the network adaptation layer piggybacks the ARP, name resolution or DHCP broadcast message in a network adaptation layer route request broadcast message. To indicate that the network adaptation layer route request broadcast message contains either the ARP, name resolution or the DHCP broadcast message, a piggyback indicator can be inserted in the network adaptation layer route request broadcast message. Alternatively, in a protocol where the request for route message is of a fixed length, a length indicator which indicates a length longer than the normal fixed length will implicitly indicate that the request contains piggyback data.

In step 715 the source node will broadcast the network adaptation layer route request message to its neighboring nodes. In step 717 the node receives the request for route message. In step 720 a neighboring node determines whether the request for route discovery message has already been processed. If the request for route discovery message has already been processed, in accordance with the "Yes" path out of decision step 720, the node will drop the message in accordance with step 725. If the node has not already processed the request for route message, in accordance with the "No" path out of decision step 720, the node will store the source node address and broadcast identifier pair in accordance with step 727. In step 730 the node stores a temporary route back to the source node. In step 732 the piggybacked data is sent up to the higher protocol layers. In step 735 the node will rebroadcast the message to all neighboring nodes.

In step 740 the node which rebroadcast the message will determine whether it is the node that generates a reply message to the piggybacked broadcast message. If the node is not the node that generates a reply message to the piggybacked broadcast message, in accordance with the "No" path out of decision block 740, then the node does not perform any further processing with regard to this message in accordance with step 745. If the node which rebroadcast the message is the node which generates a reply message to the piggybacked broadcast message, in accordance with the "Yes" path out of decision block 740, then the node will generate a reply to the ARP, name resolution or DHCP message and piggyback the reply in a network adaptation layer response message in accordance with step 750. The reply to the ARP, name resolution or DHCP message will be piggybacked by the node in a manner similar to the manner that the source node piggybacks the ARP, name resolution or DHCP request message. In step 755 the destination node activates the route in the node and send the network adaptation layer route response message back over the temporary route in accordance with step 760.

In step 765 a node in the temporary route receives the route response message and determines whether it is the source node. If the node is the source node, in accordance with the "Yes" path out of decision step 765, the node actives the route to the destination in accordance with step 766. In step 767 the node sends the piggybacked data up the protocol stack and stores the route to the destination. The source node then begins sending data over the new route in accordance with step 769.

If the node is not the source node, in accordance with the "No" path out of decision step 765, the node will activate the route in the node in accordance with step 770. In step 775 the node forwards the route response message to the next node in the temporary route which then determines whether it is the source node in accordance with step 765. This processing continues in each node along the temporary route until the source node receives the route response message.

If the source node does not receive a reply to the request for route message, e.g., the reply was dropped on the way back to the source or the request for route message did not reach the destination, the protocol layers above the network adaptation layer, e.g., ARP, will issue the broadcast again and the method is repeated.

Since FIG. 7 illustrates an exemplary embodiment where the source node is generating broadcast messages that the source node knows it will expect a reply message, a step, such as step 604 of FIG. 6, where the source node determines whether the broadcast message is the type of message which the source node expects a reply is not included in this figure. However, as described above with regard to FIG. 6, if the source node is not sure if it expects a reply to the broadcast message, the source node will piggyback the broadcast message in a request for route message.

If a broadcast message is generated by the source which is not a message for which the source node expects a reply message and the message was piggybacked on a route request message, temporary routes will be created. The temporary routes formed by broadcast messages which spread information will time out after they have not received the route response message within a certain period of time, this should not effect the network. However, to avoid this situation the higher protocol layers could inform the network adaptation layer whether the higher layers are broadcasting to trigger route discovery. Alternatively, the network adaptation layer can be designed to recognize the higher layer broadcasts and differentiate between those broadcasts that trigger route discovery, e.g., ARP, and those broadcasts which should not trigger route discovery.

Although the routing methods illustrated in FIGS. 6 and 7 are similar there is one difference to note. In step 640 of FIG. 6 if it is determined that the node which received the request for route broadcast message is the destination node then the node does not rebroadcast the request for route broadcast message. In contrast, in FIG. 7 the network adaptation layer request for route message is rebroadcast in step 735 before the node determines whether it is the node which generates a reply message. Accordingly, in the method of FIG. 7 the network adaptation layer will rebroadcast the network adaptation layer request for route message even if the node is the node which generates a reply message. The rebroadcasting is due to the fact that the network adaptation layer does not know if some of the higher protocol layers will generate a reply to the ARP, name resolution or DHCP message. Accordingly, in the method of FIG. 7 the network adaptation layer will not be dependent upon the higher protocol layers. If the network adaptation layer in the nodes were dependent upon the higher protocol layers a delay should be introduced in the network adaptation layer before rebroadcasting the route request from the node. However, this allows the nodes to prevent further flooding of the network by the broadcast messages.

Figure 8A:
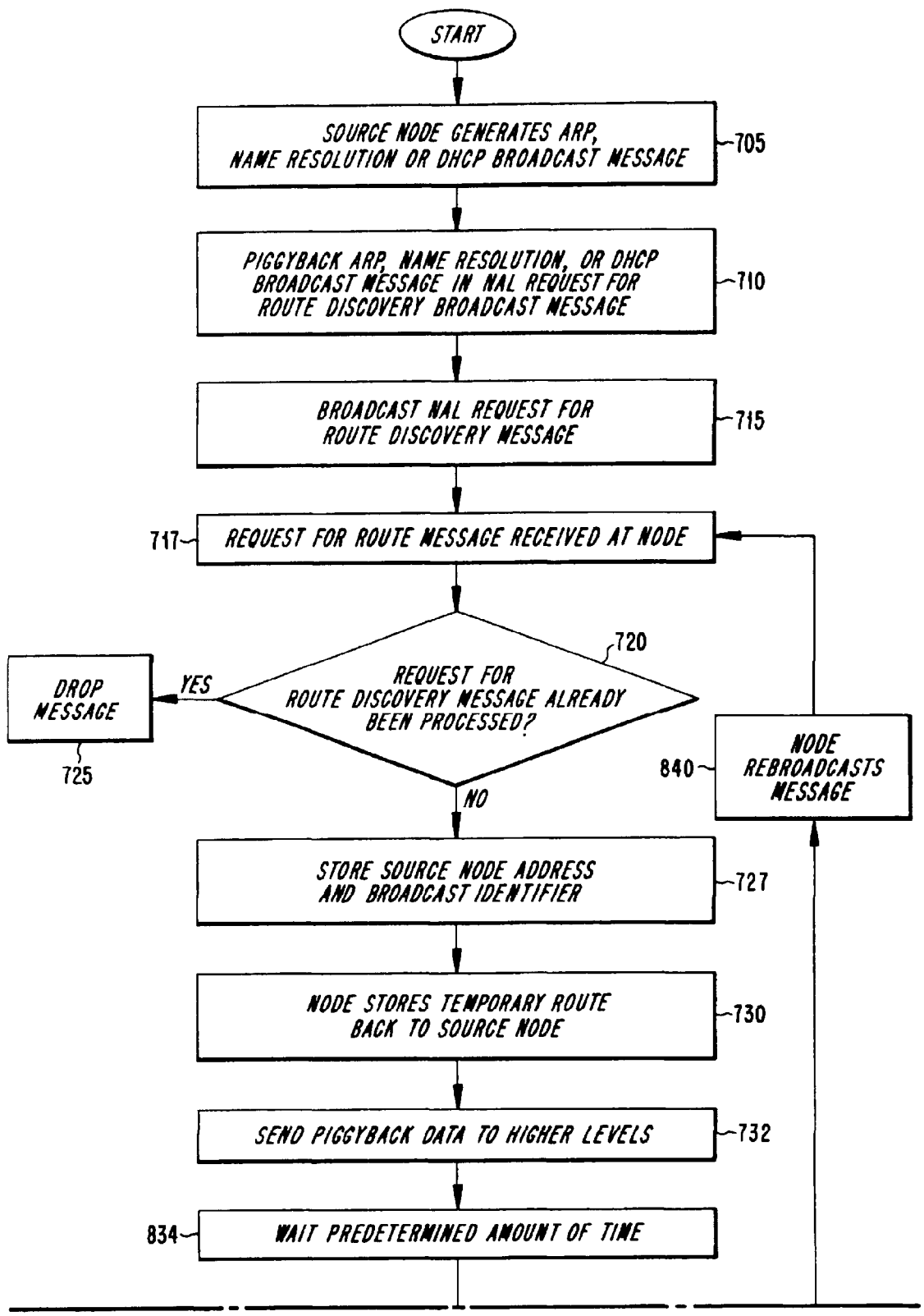
FIG. 8 illustrates another exemplary method for combining a broadcast for which a source node expects a reply message with route discovery in an ad-hoc network.
Figure 8B:
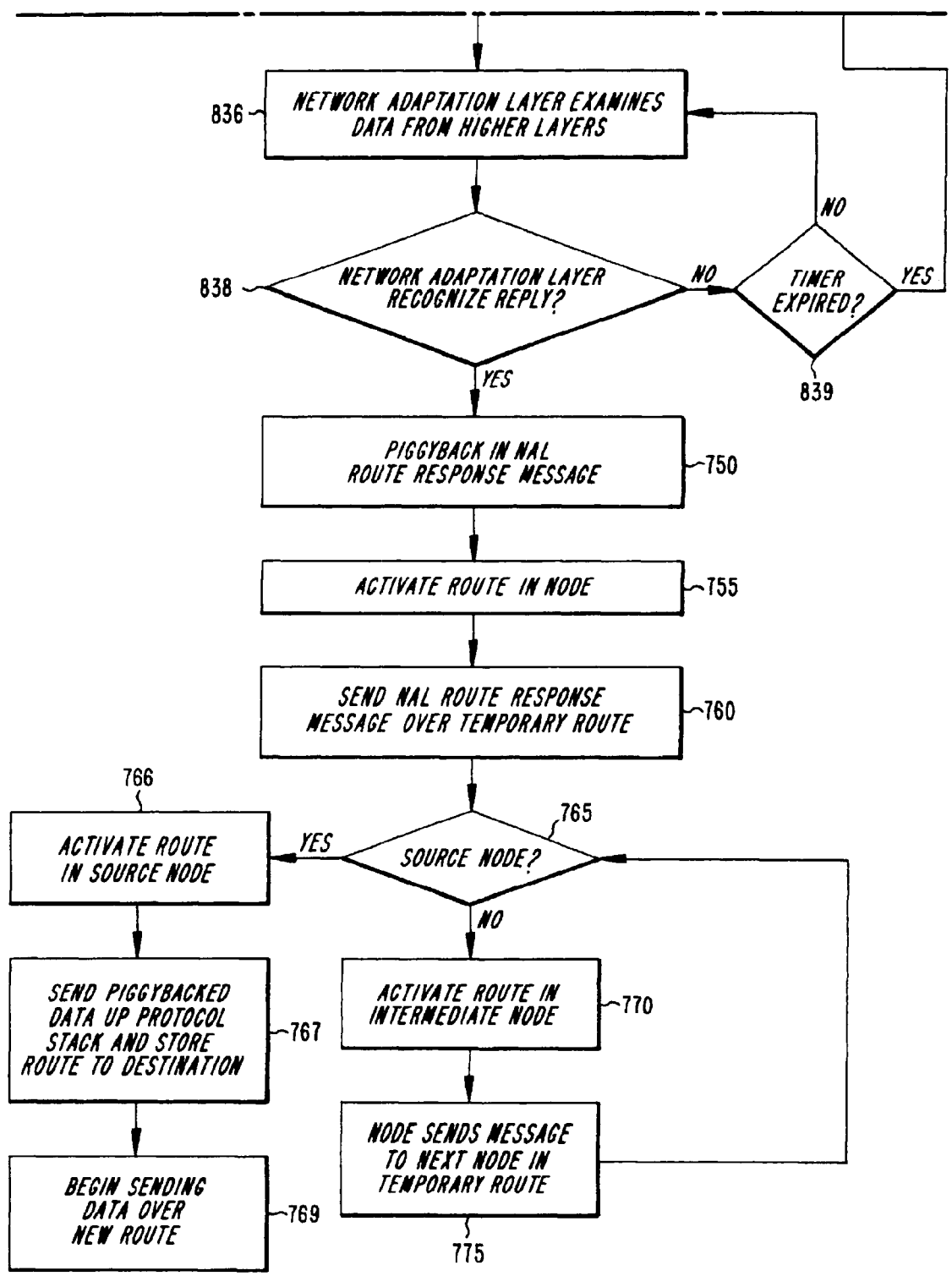
Figure 9A:
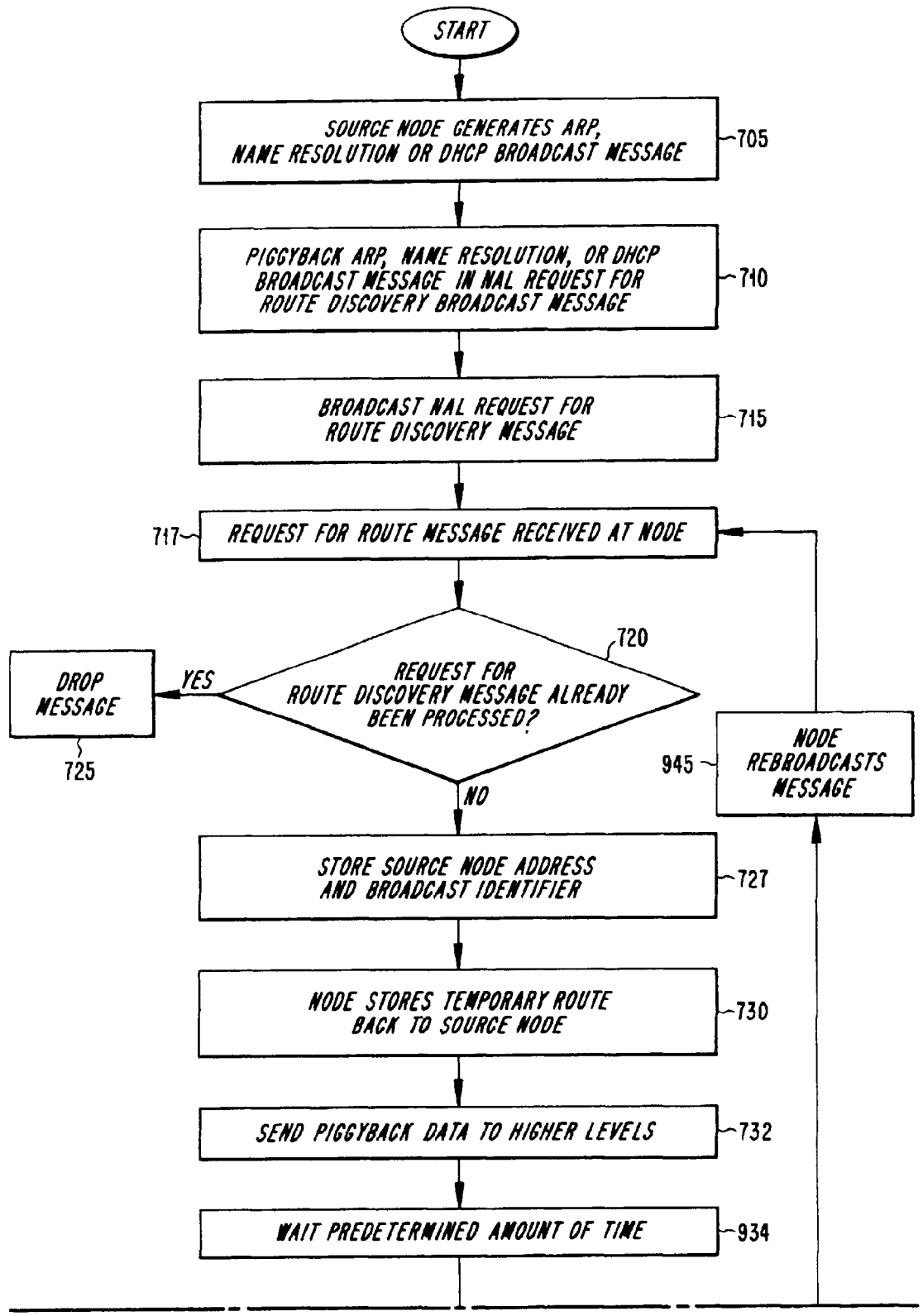
FIG. 9 illustrates yet another exemplary method for combining a broadcast for which a source node expects a reply message with route discovery in an ad-hoc network.
Figure 9B:
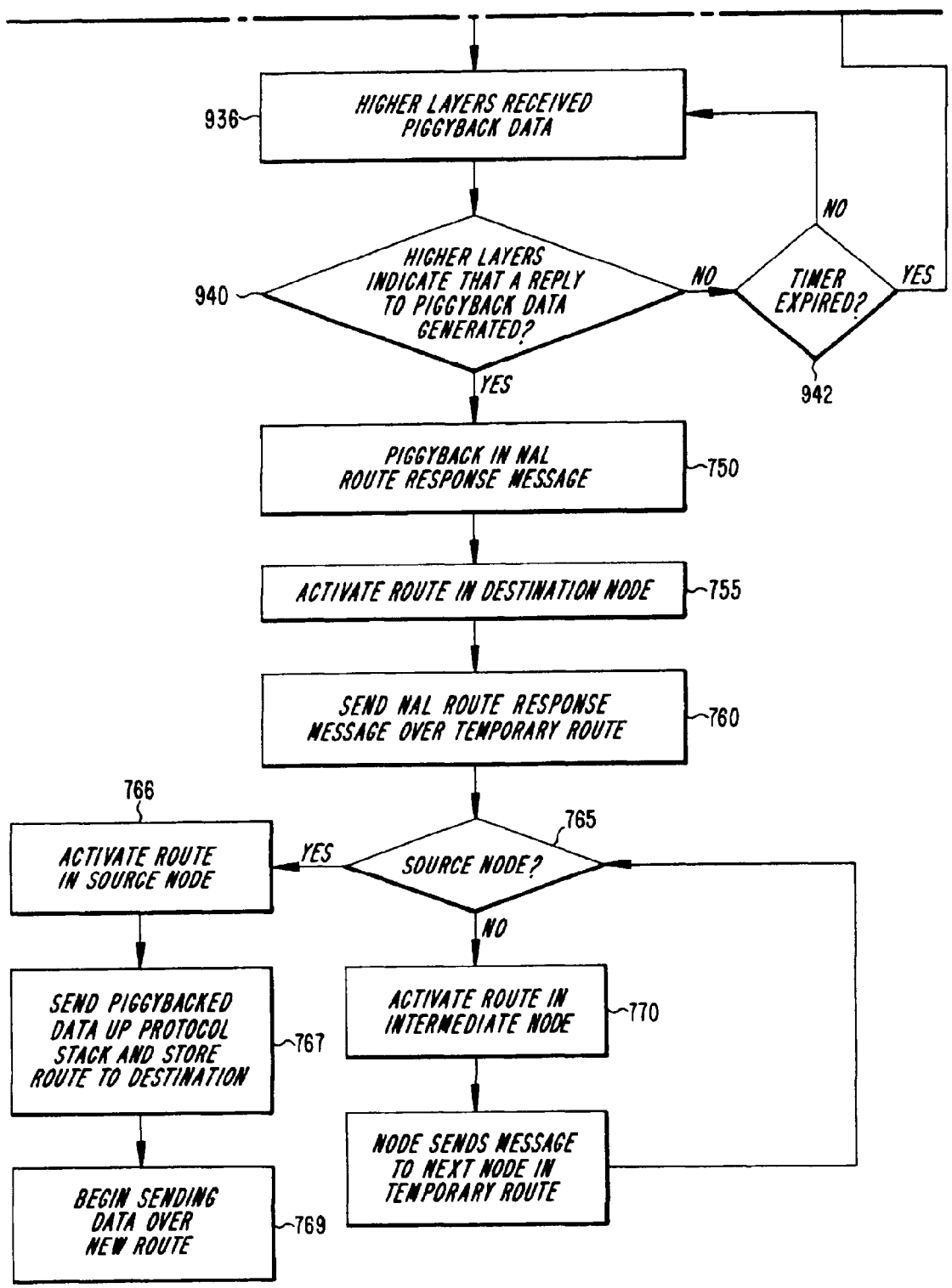

FIGS. 8 and 9 illustrate methods which allow the network adaptation layer in the node to determine whether the node which received the network adaptation layer request for route broadcast message with piggybacked data is the node which generates the reply message. The steps of FIGS. 8 and 9 are similar to the steps of FIG. 7 with steps 735, 740 and 745 replaced with five new steps. In FIG. 8 steps 735, 740 and 745 are replaced by steps 834, 836, 838, 839 and 840. In step 834 the node waits a predetermined amount of time. During this predetermined amount of time the network adaptation layer of the node will examine the data from the higher protocol layers in accordance with step 836. In step 838 it is determined whether the network adaptation layer recognizes a reply message to a DHCP, name resolution or ARP broadcast message. If the network adaptation layer recognizes a reply message, in accordance with the "Yes" path out of decision step 838, the network adaptation layer piggybacks the reply message in a route response message in accordance with step 750. The remainder of the method operates in a similar manner to that described above with regard to FIG. 7.

If the network adaptation layer does not recognize a reply message, in accordance with the "No" path out of decision step 838, it is determined whether the predetermined amount of time has expired in accordance with step 839. If the timer has not expired, in accordance with the "No" path out of decision step 839, the method returns to step 836 where the network adaption layer continues to examine the data from the higher protocol layers. If the timer has expired, in accordance with the "Yes" path out of decision step 839, then the node rebroadcasts the data in accordance with step 840. The method continues to step 717 where the next neighbor node receives the broadcast message.

Similar to the method of FIG. 8, FIG. 9 replaces steps 735, 740 and 745 replaced with steps 934, 936, 940, 942 and 945. In step 932 the node waits a predetermined amount of time. During this predetermined amount of time the higher protocol layers receive the piggybacked data in accordance with step 936. In step 940 it is determined whether the higher protocol layers have indicated that a reply to the piggybacked data has been generated. If the higher layers have indicated that a reply to the piggybacked data has been generated, in accordance with the "Yes" path out of decision step 940, then the reply message is piggybacked in the network adaption layer response message in accordance with step 750. Again the remainder of the method illustrated in FIG. 9 operates in a similar manner to that of the method described in FIG. 7.

If the higher protocol layers have not indicated that a reply to the piggybacked data has been generated, in accordance with the "No" path out of decision step 940, then it is determined whether the predetermined time period has expired in accordance with step 942. If the predetermined time period has not expired, in accordance with the "No" path out of decision step 942, then the higher layers continue to process the piggyback data in accordance with step 936. If the predetermined time period has expired, in accordance with the "Yes" path out of decision step 942, then the node rebroadcasts the message in accordance with step 945. In step 717 the processing continues as another neighbor node receives the broadcast message.

Although FIGS. 6–9 illustrate the exemplary methods as processing the broadcast message at one neighbor node at a time, one skilled in the art will recognize that the broadcast messages will be processed as the neighbor nodes receive the broadcast message. Hence, the broadcast message may be processed by some or all of the neighbor nodes at the same time or during similar time periods.

Another alternative embodiment is to only trigger route discovery for ARP broadcast messages. To implement this requires performing the routing at the network adaptation layer. Accordingly, the network adaptation layer would be ARP dependent, meaning that the network adaptation layer would recognize ARP request/reply messages. For example, if the network adaptation layer uses Ethernet encapsulation, the network adaptation layer would examine the type field in the Ethernet frame to determine whether the message is an ARP request or ARP reply message.

The difference between this embodiment and prior embodiments takes place at the node which generates the ARP reply message. According to this embodiment, the network application layer will detect the ARP response from the higher layers as an ARP message with a unicast destination address. Similarly, at the node which generates the ARP reply message the network application layer will detect ARP requests as ARP messages with the broadcast address as the destination address. In the Ethernet encapsulation case, the ARP requests are detected as Ethernet frames with the type set to ARP and the destination address set to the Ethernet broadcast address. ARP responses would be detected as Ethernet frames with the type set to ARP and the destination address set to a unicast Ethernet address.

In the methods described above, the nodes do not determine whether there is a cached route to the destination stored in the node. In ARP, name resolution and DHCP the node which generates the reply message to the ARP, name resolution or DHCP may be the only node which can provide the information required for the reply message. Accordingly, an intermediate node with a cached route may not be able to provide this required information. When the broadcast is from a higher protocol layer the node may not known which nodes will be able to respond. However, an intermediate node may have a cached reply message to the ARP, name resolution or DHCP message. If this is implemented, the source node may receive two response messages to the request for route message. The first message may come from an intermediate node with the cached reply to the ARP, name resolution or DHCP message and the second response may come from the destination containing the route which has been established.

By combining route discovery with other broadcast messages the load on the network is decreased. Further, the initial route to the destination node will be created faster because of the combination of route discovery with other broadcast messages. This results in lower buffering time at the source node. The techniques and hardware implementations associated with route discovery described above, provide a simple, efficient, and precise way of identifying a route between a source node and destination node and while sending another broadcast message for which the source node expects a reply message. Consequently, the present invention conserves valuable network resources as compared with prior techniques.

The present invention has been described with reference to several exemplary embodiments. However, it will be readily apparent to those skilled in the art that it is possible to embody the invention in specific forms other than those of the exemplary embodiments described above. This may be done without departing from the spirit of the invention. These exemplary embodiments are merely illustrative and should not be considered restrictive in any way. The scope of the invention is given by the appended claims, rather than the preceding description, and all variations and equivalents which fall within the range of the claims are intended to be embraced therein.

What is claimed is:

1. In a network, a method for determining a route from a source node to another node, wherein a request for route broadcast message is used to discover and establish routes between the source node and the another node, the method comprising the steps of:

generating, in the source node, a broadcast message for which the source node expects a reply message;

placing the broadcast message in a request for route broadcast message;

broadcasting, from the source node, the request for route broadcast message to neighboring nodes;

determining, in one of the neighboring nodes, whether the one of the neighboring nodes is a node which generates the reply message;

storing in each of the neighboring nodes a temporary route back to the source node; and rebroadcasting the request for route broadcast message to all nodes which are neighboring nodes of the one of the neighboring nodes which has received the request for route broadcast message.

2. The method of claim 1, further comprising the steps of:

generating a response message to the request for route broadcast message if the one of the neighboring nodes is the node which generates the reply message;

placing the reply message in the response to the broadcast message; and sending the response message to the source node over the temporary route stored in each neighboring node in a path between the source node and the node which generated the reply message.

3. The method of claim 2, further comprising the step of:

activating a route, in each of the neighboring nodes in the route between the source node and the node which generates the reply message, as the response message is sent from the node which generates the reply message to the source node.

4. In a network, a method for determining a route from a source node to another node, wherein a request for route broadcast message is used to discover and establish routes between the source node and the another node, the method comprising the steps of:

generating, in the source node, a broadcast message for which the source node expects a reply message;

placing the broadcast message in a request for route broadcast message;

broadcasting, from the source node, the request for route broadcast message to neighboring nodes; and determining, in one of the neighboring nodes, whether the one of the neighboring nodes is a node which generates the reply message, wherein the source node, the neighboring nodes and the node which generates the reply message operate according to Bluetooth protocol.

5. In a network, a method for determining a route from a source node to another node, wherein a request for route broadcast message is used to discover and establish routes between the source node and the another node, the method comprising the steps of:

generating, in the source node, a broadcast message for which the source node expects a reply message;

placing the broadcast message in a request for route broadcast message;

broadcasting, from the source node, the request for route broadcast message to neighboring nodes;

determining, in one of the neighboring nodes, whether the one of the neighboring nodes is a node which generates the reply message;

receiving, at the one of the neighboring nodes, the request for route broadcast message;

waiting a predetermined amount of time;

examining the request for route broadcast message to determine whether the request for route broadcast message contains the broadcast message for which the source node expects the reply message; and determining, if the request for route broadcast message contains the broadcast message for which the source node expects the reply message, if the one of the neighboring nodes is the node which generates the reply message.

6. The method of claim 5, further comprising the step of:

rebroadcasting the request for route broadcast message if, after the expiration of the predetermined amount of time, it has not been determined that the one of the neighboring nodes is the node which generates the reply message.

7. The method of claim 5, further comprising the step of:

generating a response message to the request for route broadcast message if, during the predetermined amount of time, it is determined that the neighboring node is the node that generates the reply message.

8. The method of claim 7, wherein the response message contains the reply message.

9. In a network, a method for determining a route from a source node to another node, wherein a request for route broadcast message is used to discover and establish routes between the source node and the another node, the method comprising the steps of:

generating, in the source node, a broadcast message for which the source node expects a reply message;

placing the broadcast message in a request for route broadcast message;

broadcasting, from the source node, the request for route broadcast message to neighboring nodes;

determining, in one of the neighboring nodes, whether the one of the neighboring nodes is a node which generates the reply message;

waiting a predetermined amount of time; and determining whether a higher protocol layer has sent an indication to a lower protocol layer that a reply message has been generated.

10. The method of claim 9, further comprising the step of:

rebroadcasting the request for route broadcast message if, after the predetermined amount of time, the higher protocol layer has not sent the indication that the reply message has been generated.

11. The method of claim 9, further comprising the step of:

generating a response message to the request for route broadcast message if, during the predetermined amount of time, the higher protocol layer has sent the indication that a reply message has been generated.

12. In a network, a method for determining a route from a source node to another node, wherein a request for route broadcast message is used to discover and establish routes between the source node and the another node, the method comprising the steps of:

generating, in the source node, a broadcast message for which the source node expects a reply message;

placing the broadcast message in a request for route broadcast message;

broadcasting, from the source node, the request for route broadcast message to neighboring nodes; and determining, in one of the neighboring nodes, whether the one of the neighboring nodes is a node which generates the reply message, wherein the broadcast message for which the source node expects a reply message is formed in accordance with name resolution protocol.

13. In a network, a method for determining a route from a source node to another node, wherein a request for route broadcast message is used to discover and establish routes between the source node and the another node, the method comprising the steps of:

generating, in the source node, a broadcast message for which the source node expects a reply message;

placing the broadcast message in a request for route broadcast message;

broadcasting, from the source node, the request for route broadcast message to neighboring nodes; and determining, in one of the neighboring nodes, whether the one of the neighboring nodes is a node which generates the reply message, wherein the broadcast message for which the source node expects a reply message is formed in accordance with dynamic host configuration protocol (DHCP).

14. In a network, a method for determining a route from a source node to another node, wherein all nodes in the network include a network adaptation layer and a higher protocol layer, the method comprising the steps of:

generating, in the higher protocol layer of the source node, a broadcast message for which the source node expects a reply message;

placing the broadcast message for which the source node expects a reply message in a network adaptation layer request for route broadcast message; and broadcasting, from the source node, the network adaptation layer request for route broadcast message to neighboring nodes.

15. The method of claim 14, further comprising the steps of:

waiting a predetermined amount of time; and determining whether a higher protocol layer has sent an indication to the network adaptation layer that the reply message has been generated.

16. The method of claim 15, further comprising the step of:

rebroadcasting the request for route broadcast message if, after the predetermined amount of time, the higher protocol layer has not sent the indication to the network adaptation layer that the reply message has been generated.

17. The method of claim 15, further comprising the step of:

generating, in the network adaptation layer, a response message to the request for route broadcast message if, during the predetermined amount of time, the higher protocol layer has sent the indication to the network adaptation layer that the reply message has been generated.

18. The method of claim 14, wherein the higher layer operates in accordance with Internet Protocol (IP).

19. In a network, an arrangement for determining a route from a source node to another node, wherein a request for route broadcast message is used to discover and establish routes between the source node and the another node, the arrangement comprising:

means for generating, in the source node, a broadcast message for which the source node expects a reply message;

means for placing the broadcast message in a request for route broadcast message;

means for broadcasting, from the source node, the request for route broadcast message to neighboring nodes;

means for determining, in one of the neighboring nodes, whether the one of the neighboring nodes is a node which generates the reply message;

means for storing in each of the neighboring nodes a temporary route back to the source node; and means for rebroadcasting the request for route broadcast message to all nodes which are neighboring nodes of the one of the neighboring nodes which has received the request for route broadcast message.

20. The arrangement of claim 19, further comprising:

means for generating a response message to the request for route broadcast message if the one of the neighboring nodes is the node which generates the reply message;

means for placing the reply message in the response to the broadcast message; and means for sending the response message to the source node over the temporary route stored in each neighboring node in a path between the source node and the node which generated the reply message.

21. The arrangement of claim 20, further comprising:
means for activating a route, in each of the neighboring nodes in the route between the source node and the node which generates the reply message, as the response message is sent from the node which generates the reply message to the source node.

22. In a network, an arrangement for determining a route from a source node to another node, wherein a request for route broadcast message is used to discover and establish routes between the source node and the another node, the arrangement comprising:
means for generating, in the source node, a broadcast message for which the source node expects a reply message;
means for placing the broadcast message in a request for route broadcast message;
means for broadcasting, from the source node, the request for route broadcast message to neighboring nodes; and
means for determining, in one of the neighboring nodes, whether the one of the neighboring nodes is a node which generates the reply message,
wherein the source node, the neighboring nodes and the node which generates the reply message operate according to Bluetooth protocol.

23. In a network, an arrangement for determining a route from a source node to another node, wherein a request for route broadcast message is used to discover and establish routes between the source node and the another node, the arrangement comprising:
means for generating, in the source node, a broadcast message for which the source node expects a reply message;
means for placing the broadcast message in a request for route broadcast message;
means for broadcasting, from the source node, the request for route broadcast message to neighboring nodes;
means for determining, in one of the neighboring nodes, whether the one of the neighboring nodes is a node which generates the reply message;
means for receiving, at one of the neighboring nodes, the request for route broadcast message;
means for waiting a predetermined amount of time;
means for examining the request for route broadcast message to determine whether the request for route broadcast message contains the broadcast message for which the source node expects the reply message; and
means for determining, if the request for route broadcast message contains the broadcast message for which the source node expects the reply message, if the one of the neighboring nodes is the node which generates the reply message.

24. The arrangement of claim 23, further comprising:
means for rebroadcasting the request for route broadcast message if, after the expiration of the predetermined amount of time, it has not been determined that the one of the neighboring nodes is the node which generates the reply message.

25. The arrangement of claim 23, further comprising:
means for generating a response message to the request for route broadcast message if, during the predetermined amount of time, it is determined that the neighboring node is the node that generates the reply message.

26. The arrangement of claim 25, wherein the response message contains the reply message.

27. In a network, an arrangement for determining a route from a source node to another node, wherein a request for route broadcast message is used to discover and establish routes between the source node and the another node, the arrangement comprising:
means for generating, in the source node, a broadcast message for which the source node expects a reply message;
means for placing the broadcast message in a request for route broadcast message;
means for broadcasting, from the source node, the request for route broadcast message to neighboring nodes;
means for determining, in one of the neighboring nodes, whether the one of the neighboring nodes is a node which generates the reply message;
means for waiting a predetermined amount of time; and
means for determining whether a higher protocol layer has sent an indication to a lower protocol layer that a reply message has been generated.

28. The arrangement of claim 27, further comprising:
means for rebroadcasting the request for route broadcast message if, after the predetermined amount of time, the higher protocol layer has not sent the indication that the reply message has been generated.

29. The arrangement of claim 27, further comprising:
means for generating a response message to the request for route broadcast message if, during the predetermined amount of time, the higher protocol layer has sent the indication that a reply message has been generated.

30. In a network, an arrangement for determining a route from a source node to another node, wherein a request for route broadcast message is used to discover and establish routes between the source node and the another node, the arrangement comprising:
means for generating, in the source node, a broadcast message for which the source node expects a reply message;
means for placing the broadcast message in a request for route broadcast message;
means for broadcasting, from the source node, the request for route broadcast message to neighboring nodes; and
means for determining, in one of the neighboring nodes, whether the one of the neighboring nodes is a node which generates the reply message,
wherein the broadcast message for which the source node expects a reply message is formed in accordance with name resolution protocol.

31. In a network, an arrangement for determining a route from a source node to another node, wherein a request for route broadcast message is used to discover and establish routes between the source node and the another node, the arrangement comprising:
means for generating, in the source node, a broadcast message for which the source node expects a reply message;
means for placing the broadcast message in a request for route broadcast message;
means for broadcasting, from the source node, the request for route broadcast message to neighboring nodes; and means for determining, in one of the neighboring nodes, whether the one of the neighboring nodes is a node which generates the reply message, wherein the broadcast message for which the source node expects a reply message is formed in accordance with dynamic host configuration protocol (DHCP).

32. In a network, an arrangement for determining a route from a source node to another node, wherein all nodes in the network include a network adaptation layer and a higher protocol layer, the arrangement comprising:

means for generating, in the higher protocol layer of the source node, a broadcast message for which the source node expects a reply message;

means for placing the broadcast message for which the source node expects a reply message in a network adaptation layer request for route broadcast message; and means for broadcasting, from the source node, the network adaptation layer request for route broadcast message to neighboring nodes.

33. The arrangement of claim 32, further comprising:

means for waiting a predetermined amount of time; and means for determining whether a higher protocol layer has sent an indication to the network adaptation layer that the reply message has been generated.

34. The arrangement of claim 33, further comprising:

means for rebroadcasting the request for route broadcast message if, after the predetermined amount of time, the higher protocol layer has not sent the indication to the network adaptation layer that the reply message has been generated.

35. The arrangement of claim 33, further comprising:

means for generating, in the network adaptation layer, a response message to the request for route broadcast message if, during the predetermined amount of time, the higher protocol layer has sent the indication to the network adaptation layer that the reply message has been generated.

36. The arrangement of claim 32, wherein the higher layer operates in accordance with Internet Protocol (IP).

* * * * *